S. A. FLOWER.
AIRSHIP.
APPLICATION FILED JUNE 25, 1917.

1,298,487.

Patented Mar. 25, 1919.
5 SHEETS—SHEET 1.

Inventor
Spenser A. Flower

S. A. FLOWER.
AIRSHIP.
APPLICATION FILED JUNE 25, 1917.

1,298,487.

Patented Mar. 25, 1919.
5 SHEETS—SHEET 3.

Inventor
Spenser A. Flower

S. A. FLOWER.
AIRSHIP.
APPLICATION FILED JUNE 25, 1917.

1,298,487.

Patented Mar. 25, 1919.
5 SHEETS—SHEET 5.

Witnesses

Inventor
Spenser A. Flower

UNITED STATES PATENT OFFICE.

SPENSER A. FLOWER, OF LONDON, ENGLAND.

AIRSHIP.

1,298,487.  Specification of Letters Patent.  Patented Mar. 25, 1919.

Application filed June 25, 1917. Serial No. 176,865.

*To all whom it may concern:*

Be it known that I, SPENSER ALDBOROUGH FLOWER, a subject of the King of Great Britain, residing in London, England, have invented certain new and useful Improvements in and Connected with Airships, of which the following is a specification.

The invention relates to airships in which the gas is contained in separate bags or ballonnets inclosed in a cage or envelop similar to that in use on rigid ships of the Zeppelin type. The construction according to the invention enables the strength necessary to withstand the stresses to which the structure is exposed to be obtained by means which involve less weight and at the same time are easy and cheap to build.

In the usual constructions, the internal gas pressure acting radially outward upon the cage or envelop is borne by lattice girders disposed longitudinally between transverse frames, which may be constructed as wheels with rims and spokes, and which separate the various gas bags. The main bending moments and shearing forces due to the weight of the structure and the wind pressure are either borne by the lattice girders which also resist the gas pressure or by a girder running the length of the ship composed of separate members connected by other members disposed perpendicularly and diagonally across the intervening spaces. In these known constructions very many parts are exposed to complex stresses arising from bending moments, shearing forces, etc., the magnitude and direction of which are not always accurately known.

In the construction according to the present invention, the members resisting compression are distinct from those resisting tension and can consequently be made of suitable form and materials to withstand the nature of the stresses to which they are exposed. For example, all the longitudinal compression arising from the gas pressure and the bending moments is taken by a central boom and the tensile forces are borne by systems of longitudinal and of inclined wires passing between and secured to transverse frames.

In previously proposed arrangements in which a central boom is provided with transverse frames and in which the gas bags are inclosed by longitudinal or spirally disposed wires, these wires have not been secured to the transverse frames and while provided in order to add to the torsional rigidity of the structure and to give the required contour to the envelop, they are not adapted to withstand the tensile stresses to which each section between the transverse frames is exposed.

Also, in known designs in which a longitudinal shaft with an outer casing forms with a metal sheathing the skeleton frame of the balloon, strengthened by wires extending between adjacent circular ribs, such wires have not been exposed to the gas pressure exerted on the gas bags.

The arrangement by which the tensile forces due to the weight of the structure and also to the pressure of the gas in the gas bags are borne by the wires secured to and connecting adjacent transverse frames forms an essential feature of the present construction.

According to the invention, the pressure of the gas in the gas bags is taken by a set of wires, secured to the inner parts of the rims of transverse frames attached to the central boom and forming a cage or mesh inclosing the gas bags. These wires are not under initial tension but are sufficiently slack to enable them to readily conform to the applied pressure; the wires are inclined to the longitudinal axis of the ship at an angle, preferably, of about 45°.

Cords of hemp or other suitable material may be used in place of steel wire.

A set of longitudinal wires also secured to the inner parts of the rims of the transverse frames is connected to the inclined wires, so as to enable them to follow the required contour and prevent the formation of a "waist" at the middle points between consecutive transverse frames. Any other means of effecting this result may be used instead of the longitudinal wires.

Secured to the outer part of the rims of adjacent transverse frames is a set of longitudinal wires forming an outer cage concentric with the inner wires and to which the outer fabric is attached; these wires resist the bending moments due to the weight of the structure and to the gaseous pressure. There is also a set of wires for resisting the shearing forces inclined to the longitudinal axis, preferably, at a smaller angle than the inner inclined wires; these wires are secured to the outer part of one rim of a transverse frame and the inner part of the adjacent rim. Both the longitudinal and inclined wires of the outer cage are under initial tension.

The longitudinal wires of consecutive sections are in alinment and lie in a plane section containing the axis of the ship. These longitudinal and inclined wires are adapted to take all the tensile stresses due to main bending moments and the gas pressure exerted on the bags and to transmit these forces through the transverse frames to the boom which is subjected to compressional stresses of corresponding amount. Adjustable tensioning devices are provided for the individual wires as required.

The outer sets of wire support an external covering and as the wires form a mesh of small size, the fabric may be much lighter than in the usual constructions in which there are much larger unsupported areas. The air space between the inner and outer sets of wires acts as an insulating medium to prevent rapid interchanges of heat between the gas in the gas bags and the surrounding atmosphere.

Each section of the vessel comprised between two consecutive transverse frames forms a self-contained structure which is in equilibrium under the forces applied to it.

Each transverse frame comprises a rim of suitable section to which the longitudinal and inclined wires are secured; radial wires suitably tensioned in the manner of bicycle spokes are secured to the rims and also to flanges or sleeves forming the hubs of the frames; these flanges or sleeves are held between consecutive sections of the central boom which consists of primary and secondary members, any of which may be of tubular or built up construction.

Among the advantages gained by the general system of construction may be mentioned the symmetrical arrangement of the parts about the axis of the ship which provides strength to resist forces, such as wind pressure, which may be applied in different directions. There is great resistance against flexure or deformation, while at the same time the structure is sufficiently elastic to resist local injury from contact with the ground, sheds or the like and the central boom is protected from contact with external agencies. The hollow or built-up central boom may be used for leading the control wires for operating the rudders and elevators. The duplication and replacement of parts is rendered easy since each section is similar to but independent of the others.

Improved details of construction and arrangements of parts will be explained with reference to the accompanying drawings, in which:—

Fig. 15 is a diagrammatic end view of the ship showing means for suspending a car and for driving the ship.

The central boom is made in separate lengths of, preferably, about 30 feet, and may be constructed in any one of many alternative forms. It may be of tubular cross section, reinforced as may be required internally, or it may be built up as a girder with a principal member reinforced by secondary members as shown in general arrangement in Figs. 2 and 2a, and in detail in Figs. 4, 4a and 4b, where 1 is the principal member of the boom of tubular section, reinforced by secondary members 2 and 3 connected to the tube 1 by struts 4 and diagonal members 5.

Lattice members may be substituted for any or all of the foregoing structures.

Figure 3:
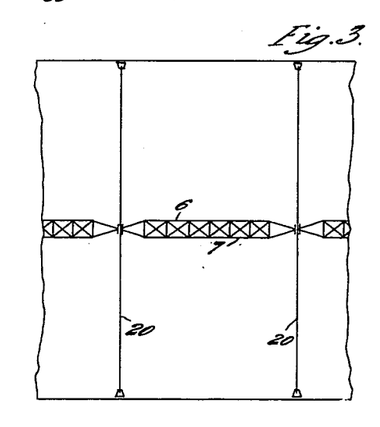
Figs. 3 and 3a are similar views of a slightly modified arrangement and Fig. 3b is a cross section of another modification of the boom.
Figure 3A:
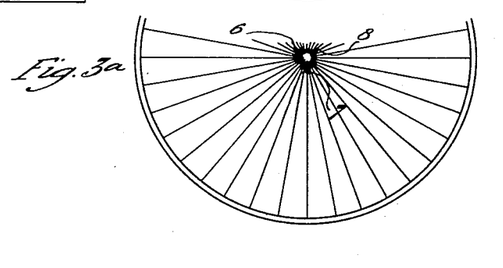
Figure 3B:
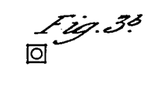
Figures 4, 4A, 4B, 5B:
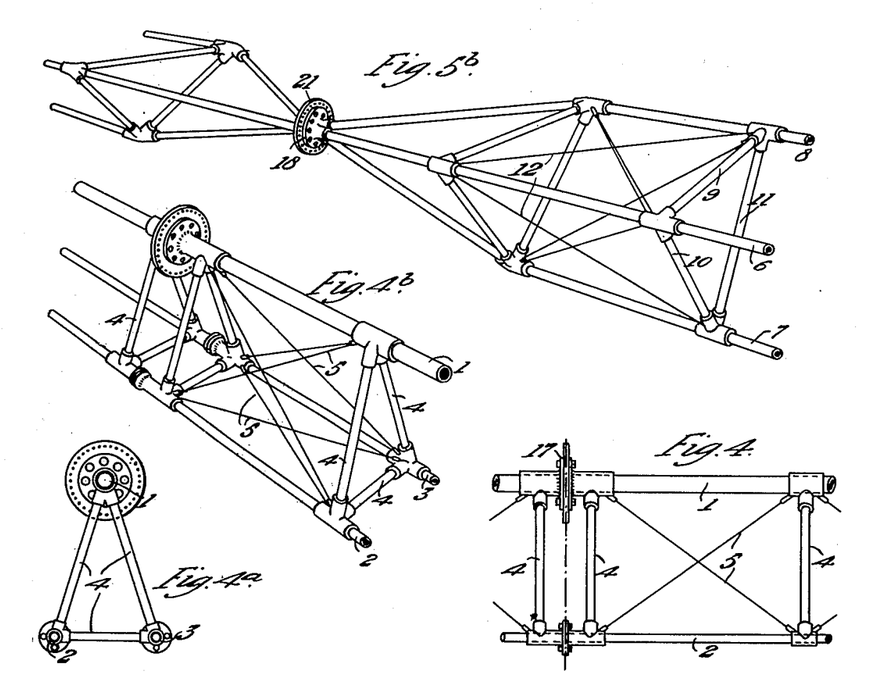
Figs. 4, 4a, 4b are, respectively, a side elevation, cross section and perspective view on a larger scale of the boom shown in Fig. 2.
Figs. 5, 5a, 5b are similar views of the boom shown in Fig. 3.
Figure 5:
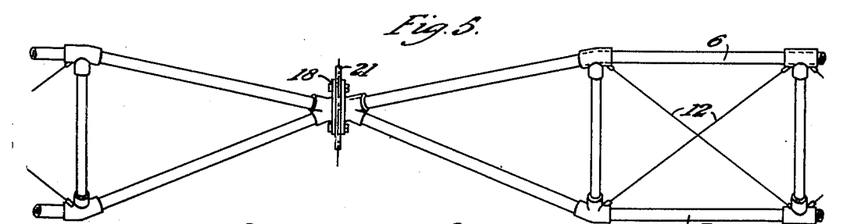
Figure 5A:
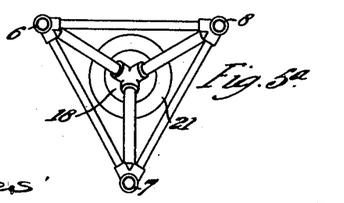

In the modification shown in Figs. 3 and 3ª and in detail in Figs. 5, 5ª and 5ᵇ, the boom is composed of three principal members 6, 7, 8 arranged in triangular form and connected by struts 9, 10, 11 and diagonal wires 12; in this construction the depth of the boom decreases toward the ends of each section. In order to secure an even distribution of the load, the arrangement is, preferably, such that the inclined ends of each section meet on the central axis.

Figures 6, 6A, 9, 10, 11, 14A:
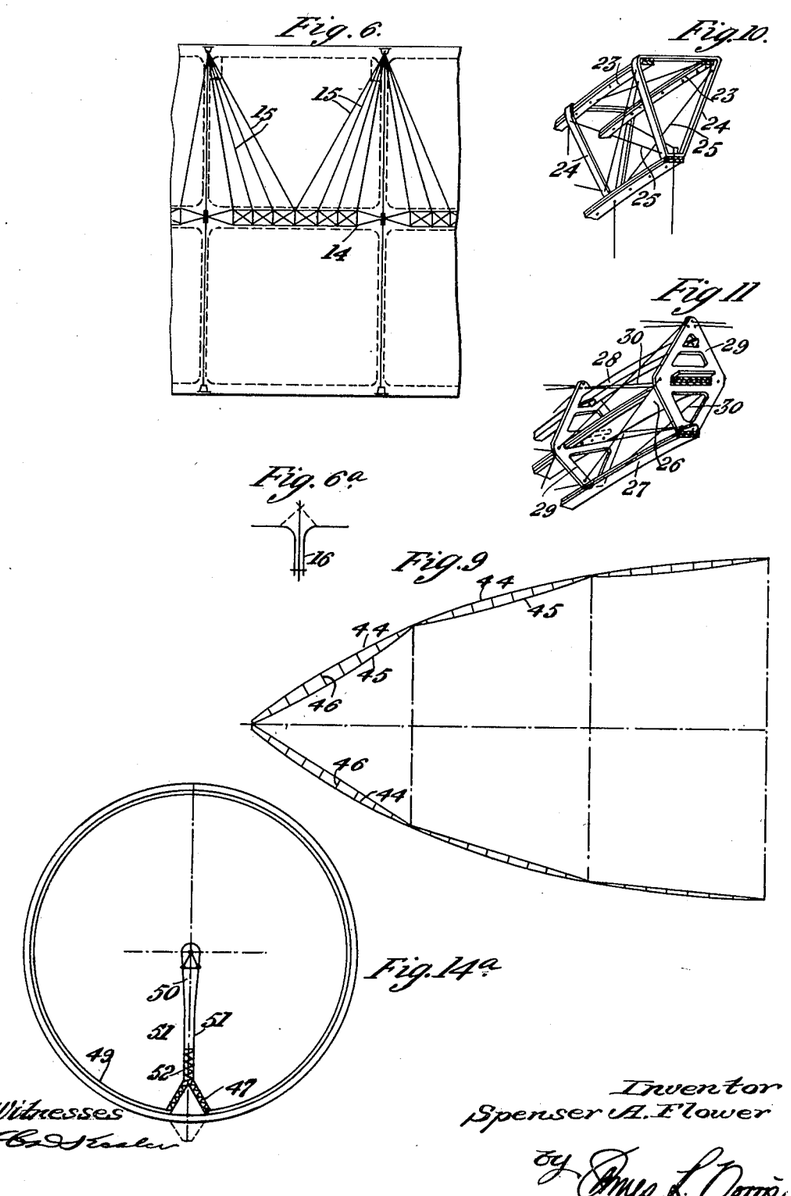
Fig. 6 shows in longitudinal section means for suspending the central boom from the transverse frames.
Fig. 6a shows a detail of the gas bag construction.
Fig. 9 shows a method of forming the contour at the bow and stern of the ship.
Figs. 10 and 11 are perspective views of alternative constructions of the rims of the transverse frames.
Figs. 14 and 14a show in elevation and cross section, respectively, the disposition of a walking way girder.

In Fig. 6 the central boom is formed of a tube 14, stayed by wires 15 suspended from the rims of the transverse frames.

In this construction, at the points where the supporting wires pass through the gas bags, sleeves 16 as shown in Fig. 6ª are provided in known manner.

The lengths of the central boom are bolted together by coupling flanges as shown at 17 in Fig. 4, and 18 in Fig. 5.

Figure 2:
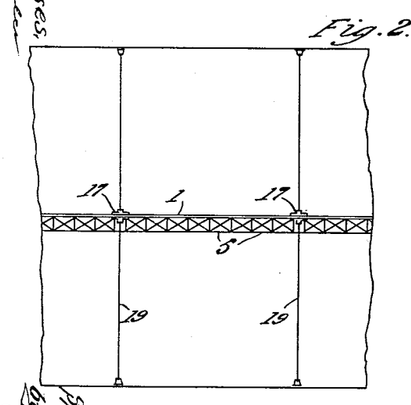
Figs. 2 and 2a show in longitudinal and cross section, respectively, a portion of the central boom and a transverse frame.
Figure 2A:
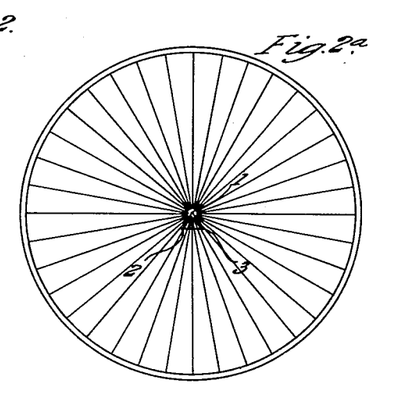

The positions of the transverse frames are indicated at 19 in Fig. 2 and 20 in Fig. 3. The frames, as stated previously, are built with radial spokes in the manner of bicycle wheels; the hub 21 of a frame is, preferably, clamped, as shown in Fig. 5, between the coupling flanges of two adjacent boom sections.

Figure 12:
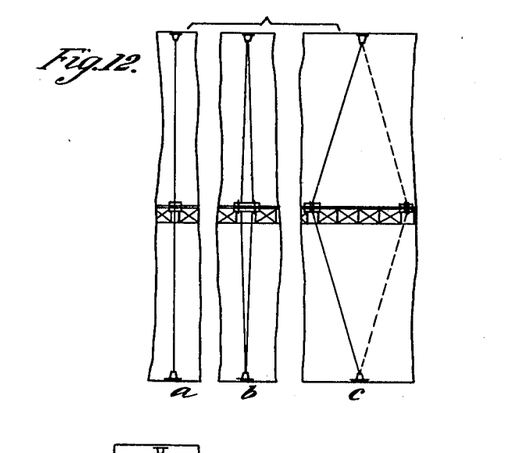
Fig. 12 shows different arrangements of the radial spokes of the frames.

In Fig. 12, a, b, c show different arrangements of the radial spokes. In a, all the wire spokes are in the central plane; in b, two sets of spokes are provided, connected, respectively, to flanges at the opposite ends of the hub sleeve; in c there is only one set of spokes, shown in full lines, formed as a cone in which the vertical angle is much greater than in b. The single system of spokes increases the space available for the gas bags. In this case, a temporary set of wires, shown in the figure by dotted lines, may be provided during the process of manufacturing and afterward removed when the frame is held in position by the longitudinal wires.

Spokes inclined as shown at c in Fig. 12 at a considerable angle to the vertical may be used at sections where the bending moments are exceptionally great and help the boom at these sections to resist and localize the stresses due to these moments. Sections near the stern of the vessel are exposed to bending moments due to the weight of the main planes much beyond the values at other parts and may be specially strengthened in this manner.

In either of the arrangements adopted the spokes may be disposed on the tangent system and an initial tension applied to the wires.

Figures 13, 14:
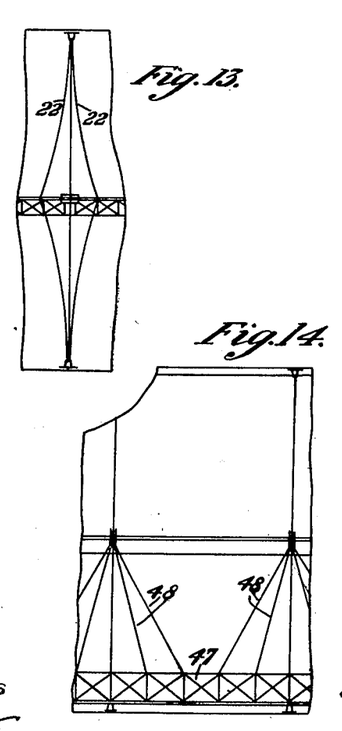
Fig. 13 shows an additional wire system for taking the endwise thrusts of the gas bags.

In Fig. 13 wires, additional to the spokes, are shown disposed on either side of the central plane and also connected at one end to the rim and at the other end to a flange of the sleeve of the hub. These wires 22 are intended to take up the pressures exerted in the axial direction of the ship by the gas bags filling the space between two transverse frames. For this purpose the wires are without initial tension and are of sufficient length to take up the gas pressure without excessive tension; these wires insure that the endwise pressure due to deflation or partial deflation of a gas bag in any section is not borne by the spokes, which provide the necessary stiffness to resist deformation of the rim and transmit the forces arising from the lifting power of the hydrogen to the central boom.

The rims of the frames may be formed in any one of many different constructions.

Figures 6, 7, 8:
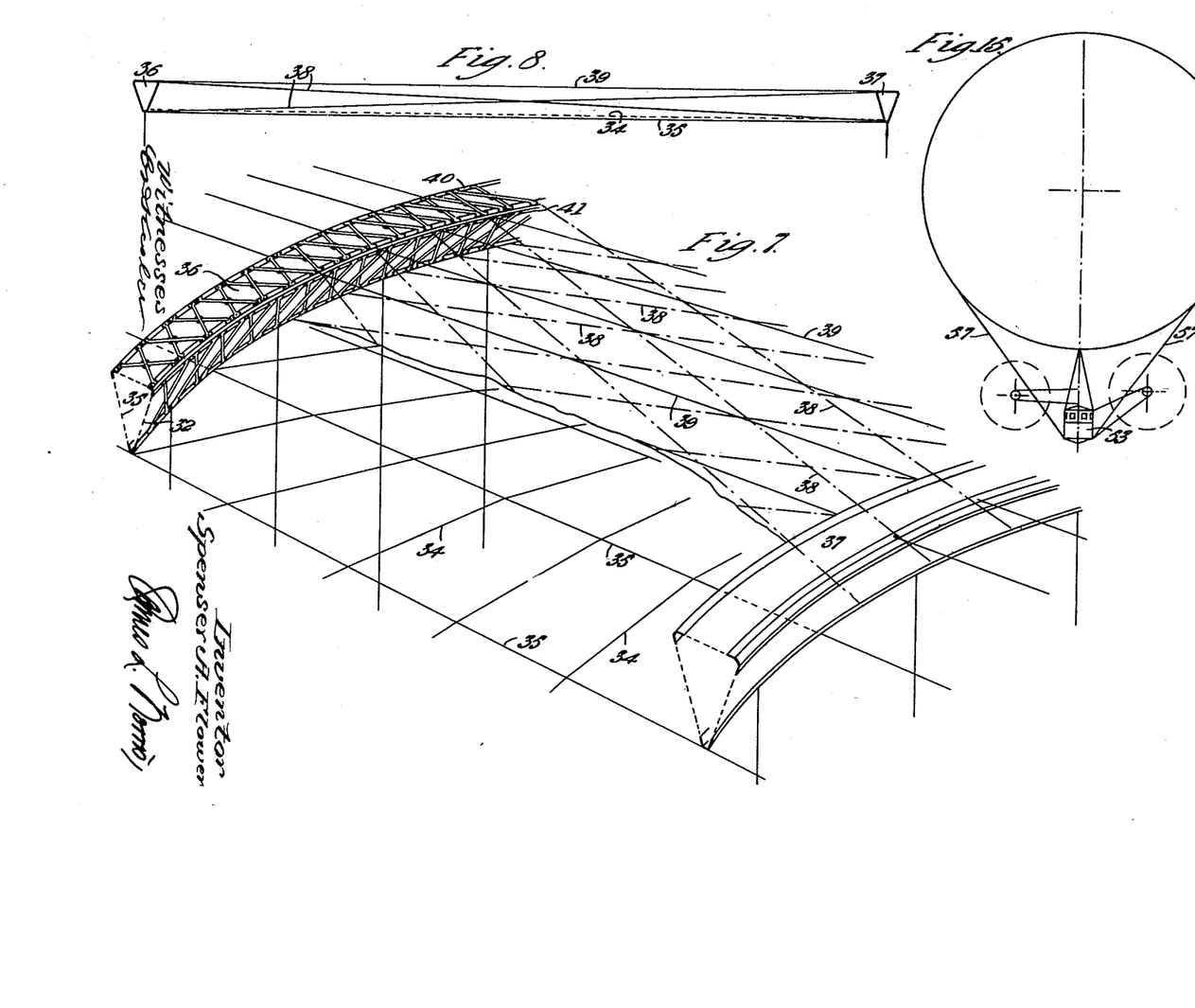
Figs. 7 and 8 are, respectively, a perspective view and an elevation showing the disposition of the longitudinal and inclined wires between two adjacent frames.

In Fig. 7, the rim is formed as an open-work girder, strengthened by struts and diagonal braces. In this case the rim is entirely metal.

In the rims, shown, by way of example, in Figs. 10 and 11, there is a combination of metal and wood. In Fig. 10, the circumferential members 23 are of wood (preferably laminated) and the cross members 24 and diagonals 25 of metal.

In Fig. 11, the principal member 26 and the secondary members 27 and 28 are of wood (preferably laminated), while the cross members 29 and stays 30 are metal.

The form of the section of the rim is not an essential feature of the construction according to the invention and is obviously capable of many modifications.

To the inner edge of each side 32, 33 of the rim shown in Fig. 7 are secured two sets of wires 34, 35 connecting consecutive transverse frames such as 36 and 37. One set of wires 35 is arranged longitudinally and is continuous in direction with similar longitudinal wires secured to the other side of the frame. The other set consists of wires 34 placed so that its members are inclined to the axis of the ship. A double set of inclined wires is, preferably, employed, one set with a left-handed and the other with a right-handed lay.

A set of longitudinal wires 39 is secured to the outer flanges 40 and 41 of adjacent frames 36, 37. A set of inclined wires 38 is also secured between the outer flange of the transverse frame and the inner flanges of the adjacent frames.

The right-handed and left-handed sets of inclined wires, preferably, meet at points on each transverse frame and are in alinement with the corresponding sets of inclined wires in the next section.

An initial tension is applied to the outer longitudinal wires inducing a corresponding compression in the central boom and ends of these wires may be connected to springs in order to insure an even distribution of load between the individual members. The inclined wires of the inner set are without initial tension in order that they may be free to follow the external surface determined by the inner longitudinals and conform to the gaseous pressure exerted on the gas bags.

The inclined wires of the inner set are, preferably, connected to the inner longitudinal wires at the points of crossing.

Figure 1:
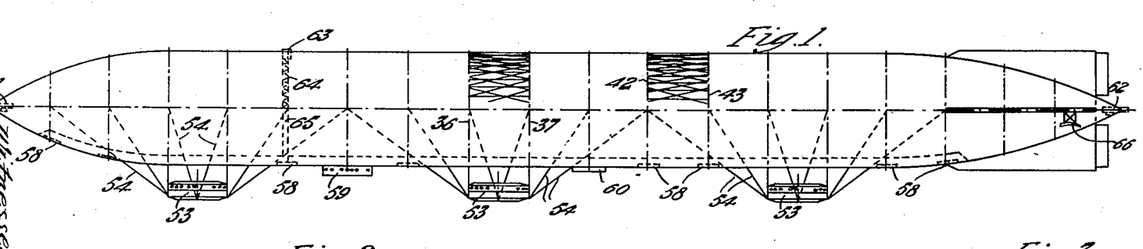
Figure 1 is a side view of an airship according to the invention.

In Fig. 1 the arrangement of the longitudinal and inclined wires is shown diagrammatically, the inner set between frames 36 and 37 and the outer set between frames 42 and 43. The relative disposition of the wires is also shown in Fig. 8.

It may be advisable to continue a certain number of the wires through one or more transverse frames, so that in case of damage to any section it may receive sufficient support from adjoining sections.

The primary function of the longitudinal wires of the outer set is to act as tension members to take the bending moment stresses in the systems of which the central boom is the compression member. The primary function of the inclined wires of the inner set is to form a cage to withstand the outward pressure exerted by the gas bags. These wires are not initially exposed to the high values of the tensile forces which would have to be borne by wires such as the longitudinals, substantially parallel to the axis of the ship. To reduce these tensile forces to moderate values this set of wires is inclined at an angle to the axis of the ship. The inclined wires of the outer set resist the shearing forces and tend to resist bending moments.

To obtain the curved contour at the nose of the ship necessary to minimize the wind resistance, it is proposed, as shown in Fig. 9, to provide at the forward sections additional wires 44 separated by distance pieces 46 from the straight or slightly curved longitudinals 45. By adjusting as required the length of the distance pieces any required curvature can be given to these sections.

Figs. 14 and 14ª show a light built-up girder 47 acting as a walking way attached at the under side of the hull to transverse frames and suspended from the central boom by wires 48; the girder may be of triangular cross section, disposed within the inner shell as shown by the full lines in Fig. 14ª, or outside the outer envelop as shown by the dotted lines. The gas bags 49 may be formed with a slot 50 at the lower half to enable them to pass over the central boom, opening out into a wider aperture to accommodate the girder. The slotted passage 50 may be used for the suspension wires 48 and for wires supporting the gondolas. Partitions 51 in the gas bags may be constructed of a material similar to that used in the body of the bags and the parts may be held together by lacing 52.

The light girder is not intended to provide additional structural strength to the hull, but to form a walking-way or communication passage between the gondolas and other parts of the ship, to act as a conduit for the control wires, electric cables, oil and water pipes, etc., and also as a support for petrol, oil, and ballast tanks, cabins and bomb racks, which are preferably disposed in positions not closely adjacent to the gondolas.

The gondolas 53 (Figs. 1 and 15) are supported by suspension wires 54 secured to the central boom passing through the slots in the gas bags in the manner explained in connection with the suspension wires of the walking-way. These wires may be disposed relatively to the central boom so as to insure the steadiness of the gondolas in a fore and aft direction and also to transmit the thrust of the propellers 55, 56.

Other suspension members 57 attached to the outer rims of the transverse frames, or passing around the hollow rims of the frames, may be provided to assist in supporting the weight of the cars but mainly to prevent them from rolling. The transverse frames used for this purpose as well as those supporting large loads may be specially strengthened.

In Fig. 1, the tanks for petrol and other stores and ballast are shown at 58; 59 is a cabin; 60 is a bomb rack; 61, 62 and 63 are guns; 64 is a girder stair-way supporting a gun 63; 65 is a stairway.

Struts of any suitable construction secured to the central boom and the rims of the transverse frames provide supports for the horizontal and vertical stabilizing planes and for pivots for the rudders and elevators.

In order to reduce the large bending moments due to the weight of the main planes, auxiliary supporting planes 66 may be attached to the main planes to provide support by the upward pressure of these auxiliary planes due to the relative velocity of the air past the planes.

Having thus described the nature of my invention and the best means I know of carrying the same into practical effect, what I claim is:—

1. In an air-ship, a frame comprising in combination a central boom, transverse frames secured at intervals to the boom, flexible elements secured to adjacent transverse frames resisting the pressure of gas contained in gas bags and an outer system of longitudinal and also of inclined wires secured to the said transverse frames to resist the bending moments and shearing forces due to the weight of the structure and to the gaseous pressures.

2. In an airship, a frame comprising in combination a central boom, transverse frames secured at intervals to the boom, metallic wires secured to adjacent transverse frames resisting the pressure of gas contained in gas bags and an outer system of longitudinal and also of inclined wires secured to the said transverse frames to resist the bending moments and shearing forces due to the weight of the structure and to the gaseous pressures.

3. In an airship, a frame comprising in combination, a central boom, transverse frames secured at intervals to the boom, a system of longitudinal and also of inclined wires secured to adjacent transverse frames and an inner system of flexible elements also secured to adjacent transverse frames forming a mesh of practically circular section and inclined to the longitudinal axis of the ship.

4. In an air-ship, a frame comprising in combination a central boom, transverse frames secured at intervals to the boom, a system of longitudinal and also of inclined wires secured to adjacent tranverse frames and an inner system of flexible elements also secured to adjacent transverse frames, some of the said elements having a right-handed and some a left-handed lay and being connected at crossing points with each other and with an additional set of wires parallel to the axis of the boom.

5. In an airship, a frame comprising in combination a central boom, transverse frames secured at intervals to the boom, flexible elements secured to adjacent tranverse frames resisting the pressure of gas contained in gas bags and an outer system of longitudinal and also of inclined wires secured to the said transverse frames and an external fabric supported by the said longitudinal wires.

6. In an airship, a frame comprising in combination a central boom, transverse frames secured at intervals to the boom, flexible elements secured to the inner parts of the rims of adjacent transverse frames, longitudinal wires secured to the outer parts of the rims of the said transverse frames and inclined wires secured respectively to the inner parts of the rim of one transverse frame and the outer part of the rim of an adjacent transverse frame.

7. In an airship, a frame comprising in combination a central boom, transverse frames with radial spokes in tension secured at intervals to the boom, flexible elements secured to the inner parts of the rims of adjacent transverse frames to resist the pressure of gas in gas bags disposed between the said transverse frames, longitudinal wires secured to the outer parts of the rims of the said transverse frames and inclined wires secured, respectively, to the inner parts of the rim of one transverse frame and the outer part of the rim of an adjacent transverse frame.

8. In an airship, a frame comprising in combination a central boom, transverse frames with radial spokes in tension secured at intervals to the boom, flexible elements secured to the inner parts of the rims of adjacent transverse frames to resist the pressure of gas in gas bags disposed between the said transverse frames and other flexible members secured to the rims of the said transverse frames and disposed on opposite sides of the spokes to resist the endwise thrust exerted by the gas bags, longitudinal wires secured to the outer parts of the rims of the said transverse frames and inclined wires secured, respectivly, to the inner parts of the rim of one transverse frame and the outer part of the rim of an adjacent transverse frame.

9. In an airship, a frame comprising in combination a central boom, transverse frames with radial spokes secured at intervals to the boom, the rims being formed as an openwork girder strengthened by struts and diagonal braces, inclined wires connected to the inner parts of the rims, longitudinal wires connected to the outer parts of the rims and inclined wires connected respectively to the outer part of one rim and the inner part of an adjacent rim.

10. In an airship, a frame comprising in combination a central boom, transverse frames secured at intervals to the boom, flexible elements secured to rims of adjacent transverse frames inclosing gas bags, an outer system of longitudinal and inclined wires secured to the rims of the said transverse frames and a girder suspended from the central boom and attached to the transverse frame and serving as a walking way and a support for cabins and a storage capacity.

11. In an airship, a frame comprising in combination a central boom, transverse frames secured at intervals to the boom, flexible elements secured to rims of adjacent transverse frames inclosing gas bags, an outer system of longitudinal and inclined wires secured to the rims of the said transverse frames, part of the inclined wires having a right-handed and part a left-handed lay.

12. In an airship, a frame comprising in combination a central boom, transverse frames secured at intervals to the boom, flexible elements secured to rims of adjacent transverse frames inclosing gas bags, an outer system of longitudinal and inclined wires secured to the rims of the said transverse frames and distance pieces separating the longitudinal wires at the forward sections from another set of wires adapted to give the required contour to the nose of the ship.

13. In an airship, a frame comprising in combination a central boom, transverse frames secured at intervals to the boom, flexible elements secured to rims of adjacent transverse frames inclosing gas bags, an outer system of longitudinal and inclined wires secured to the rims of the said transverse frames and auxiliary supporting planes inclined to the horizontal plane in order to partly compensate the bending moments due to the weight of the main planes by the upward pressure due to the relative velocity of the air past the planes.

In testimony whereof I have signed my name to this specification in the presence of two subscribing witnesses.

SPENSER A. FLOWER.

Witnesses:
ALFRED JOHN MAXWELL,
B.. H. DERHAM.